Jan. 29, 1957 A. DE GROFF 2,779,122
TURNOVER FLOAT
Filed May 27, 1955
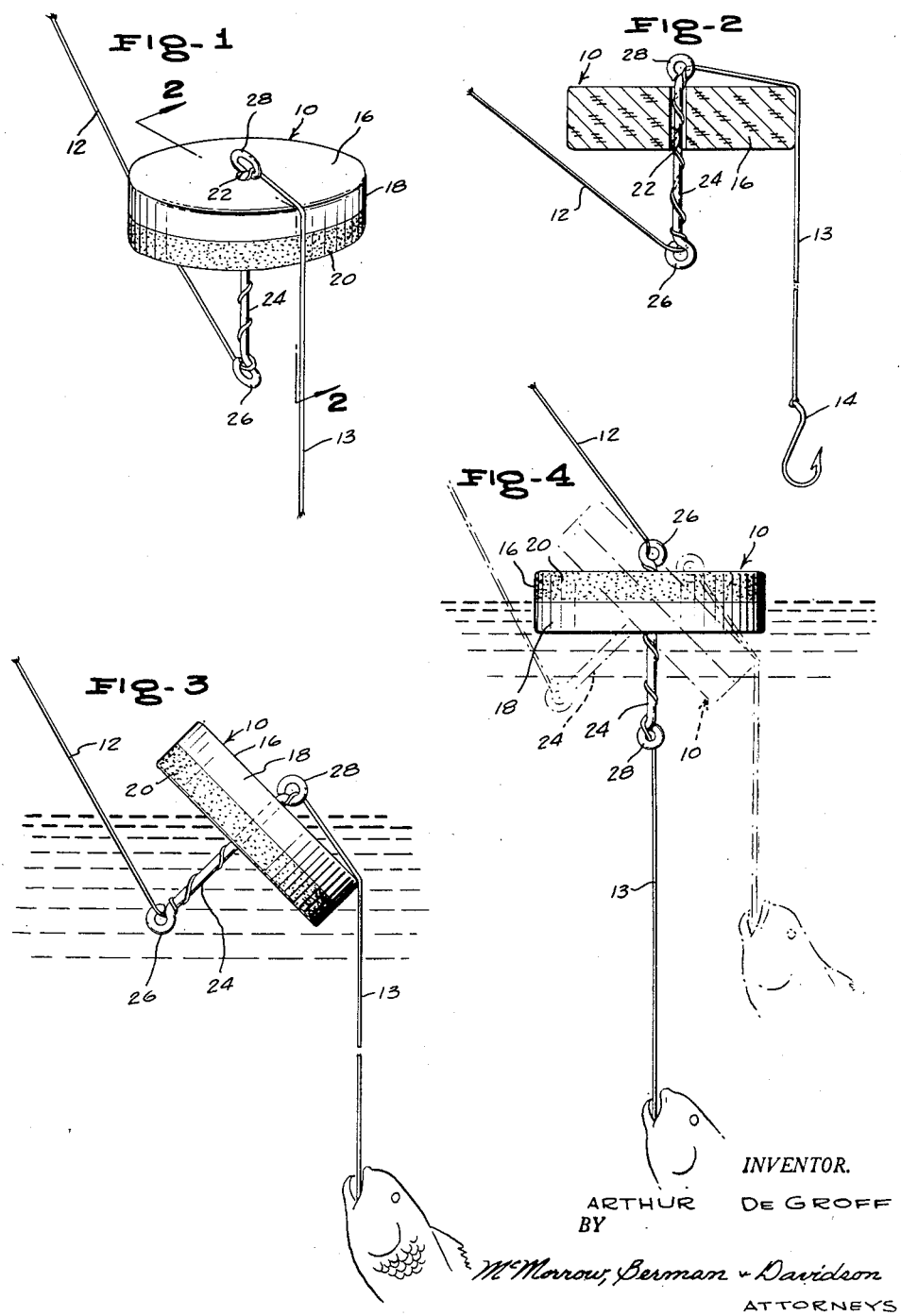
INVENTOR.
ARTHUR DE GROFF
BY
McMorrow, Berman & Davidson
ATTORNEYS

2,779,122
TURNOVER FLOAT

Arthur De Groff, Beacon, N. Y.

Application May 27, 1955, Serial No. 511,707

2 Claims. (Cl. 43—44.9)

This invention relates to an improved fishing float, and a primary object of the invention is to provide a float designed to normally remain in a right-side-up position on the water and show a distinctive face, the float being invertible responsive to pull on the associated fishing line, to show a contrasting face, and thereby inform a fisherman of the situation.

Another object of the invention is to provide a float of the type referred to which includes a freely slidable, centrally disposed weighted plunger connectible at opposite ends thereof to the main portion of a fishing line to the hook-carrying portion thereof, respectively, the plunger being arranged to freely gravitate within the associated opening of the float body to a lowermost position, in both the right side up and inverted positions of the body, to stabilize the body against accidental inversion or reversing of either of these positions.

A further object of importance is to provide a float as described which is particularly adapted for manufacture at low cost, is highly conspicuous in the water, and provides a clearly visible signal to the fisherman when a fish bites, and is adapted for connection to an associated fish line with ease and facility.

Other objects will appear from the following description, the claims appended thereto, and from the annexed drawing, in which like reference characters designate like parts throughout the several views, and wherein:

Figure 1 is a perspective view of a float formed according to the present invention, in right side up position;

Figure 2 is a sectional view on line 2—2 of Figure 1;

Figure 3 is a side elevational view of the float in use, as it appears when being inverted by a fish taking the bait; and Figure 4 is a view similar to Figure 3 in which the float is fully inverted, the dotted lines showing the float in its partially inverted position.

The illustrated float generally designated 10, is shown in association with a fishing line including a main portion 12 and, connected to said main portion, a hook-carrying portion 13 to which is attached a hook 14.

The float 10 comprises a buoyant body 16, in the form of a disc preferably a single piece of cork material or the like, but also adapted for formation from other buoyant materials such as wood, etc. The body disc is of a diameter approximately four times the distance between the parallel planes of the flat, opposed faces thereof. This is for the purpose of having the body normally resistant to inversion in water. The specified relationship of the diameter to the distance between the planes of the faces can be varied, within certain limits, but obviously, the diameters should not be so small in relation to the body thickness as to make the body too freely invertible, nor should it be so great in relation to said body thickness as to offer an excessive resistance to inversion. It is believed appropriate to state that the diameter should be at least twice as great as the body thickness.

The opposed faces and adjacent portions of the peripheral edge 17 of the body are painted in contrasting hues, so that the body includes an upper face portion 18 which in a preferred embodiment is painted red, and a lower face portion 20 which is painted white or some other distinctive color contrasting strongly with the upper face portion. The coloring can be continued as shown onto the peripheral edge 27 of the body, with the contrasting colors meeting in a plane paralleling the planes of the top and bottom faces and spaced equidistantly therefrom.

Formed in the disc is a through opening 22, said opening being formed at the center of the disc and extending perpendicularly to the planes of the top and bottom faces. The opening, at its opposite ends, opens upon the respective faces.

A plunger 24, formed of metal material or some other non-buoyant material and which will impart substantial weight to the plunger, is freely and loosely slidable within the opening 22. The plunger 24 comprises a straight shank 25 having at one end thereof, an eye 26, and at its other end an eye 28. The eyes constitute enlargements on the opposite ends of the plunger shank 25, said enlargements being of a cross sectional area, in at least one direction transversely of the plunger, greater than the cross sectional area of the opening 22. The eyes thus constitute abutments limiting sliding movement of the plunger in opposite directions within the opening 22.

In connecting the float to the fishing line, the line may first be extended through eye 26, and then coiled spirally about the plunger shank throughout the length of the shank, after which the line is passed through eye 28 and becomes the hook carrying portion 13.

In use, the hook carrying portion 13 is extended radially over the upper face 16 of the disc, while the main portion 12 extends from the lower eye 26 in underlying relation to the disc. This is the relationship of the parts in the normal, right-side-up position of the disc.

When a fish takes the hook 14 as in Figure 3, it exerts a downward pull on line portion 13 which is transmitted into a downward pull on the part of the periphery of the upper face portion engaged by said line portion 13, and also into a lateral pull on the upper end of the plunger 24. It will be noted that in the right-side-up position of the disc, the plunger is in its lowermost position within opening 22.

Such further downward pull on the line portion 13 causes the disc to turn over to the inverted position shown in full lines in Figure 4. Eye 28 is then at the lower end of the plunger, and eye 26, to which the main line portion 12 is secured, is at the upper end thereof. This causes the red bottom face portion of the disc to be disposed upwardly, providing a clearly visible signal to the fisherman that a fish has taken the hook 14, and the plunger immediately graviates to its lowermost position. The plunger being of a length such that the depending lower end portion thereof provides a stabilizing weight for the disc tending to cause the disc to resist reversal of its position, whether it be in a right side up or inverted position.

To reset the float the fisherman need only pull up on the rod a short distance, to pull the plunger to is uppermost position, and then may either turn over the float into its right side up position once again by a sharp lateral movement of the upper end of the plunger in its uppermost position, or alternatively, may manually reverse the float position so that it is again ready for use in its right side up position shown in Figure 1.

It is believed apparent that the invention is not necessarily confined to the specific use or uses thereof described above, since it may be utilized (even with minor changes) for any purpose to which it may be suited.

What is claimed is:

1. In a turn over float, a buoyant flat disc having a central opening therethrough, said disc having top and bottom faces of contrasting appearances, a weighted plunger comprising a straight shank substantially smaller in diameter than said opening, said shank being freely and loosely slidable through said opening and being substantially longer than the thickness of said disc, said shank having eyes on its opposite ends each wider than said opening, said eyes including an upper eye above the top face of the disc and a bottom eye below the bottom face of the disc.

2. In a turn over float, a buoyant flat disc having a central opening therethrough, said disc having top and bottom faces of contrasting appearances, a weighted plunger comprising a straight shank substantially smaller in diameter than said opening, said shank being freely and loosely slidable through said opening and being substantially longer than the thickness of said disc, said shank having eyes on its opposite ends each wider than said opening, said eyes including an upper eye above the top face of the disc and a bottom eye below the bottom face of the disc, and a fishing line having an intermediate portion engaged around said shank, a main portion engaged through said bottom eye, and a fishhook carrying portion engaged through said upper eye, said fishhook carrying portion of the fishing line extending across and bearing upon the top face of the disc in the normal right-side-up position of the disc on which said top face of the disc is uppermost.

References Cited in the file of this patent

UNITED STATES PATENTS

| | | |
|---|---|---|
| 725,428 | Evans | Apr. 14, 1903 |
| 2,004,414 | Menefee | June 11, 1935 |
| 2,547,308 | Dean | Apr. 3, 1951 |
| 2,587,190 | Merriweather | Feb. 26, 1952 |
| 2,591,558 | Kramer | Apr. 1, 1952 |
| 2,592,664 | De Mello | Apr. 15, 1952 |

FOREIGN PATENTS

| | | |
|---|---|---|
| 162,146 | Austria | Jan. 25, 1949 |